United States Patent [19]

Svacik

[11] 4,053,649

[45] * Oct. 11, 1977

[54] PREPARATION OF SLICED DRIED BEEF PRODUCT

[75] Inventor: Joseph T. Svacik, Phoenix, Ariz.

[73] Assignee: Armour and Company, Phoenix, Ariz.

[*] Notice: The portion of the term of this patent subsequent to Oct. 21, 1992, has been disclaimed.

[21] Appl. No.: 602,812

[22] Filed: Aug. 7, 1975

Related U.S. Application Data

[63] Continuation-in-part of Ser. No. 360,049, March 29, 1973, Pat. No. 3,914,444.

[51] Int. Cl.² ............................................. A22C 11/02
[52] U.S. Cl. .................................. 426/266; 426/105; 426/284; 426/332; 426/456
[58] Field of Search ............... 426/284, 266, 282, 105, 426/281, 413, 274, 520, 646, 332, 641, 456, 652, 645

[56] References Cited

U.S. PATENT DOCUMENTS

| | | | |
|---|---|---|---|
| 2,135,334 | 11/1938 | Guthrie et al. | 426/641 |
| 2,224,397 | 12/1940 | Kohvarik | 426/646 X |
| 2,803,547 | 8/1957 | Glabe | 426/646 X |
| 3,032,421 | 5/1962 | Buchholz | 426/646 |
| 3,188,214 | 6/1965 | Harper | 426/646 X |
| 3,634,127 | 1/1972 | Vogel et al. | 426/646 |
| 3,663,233 | 5/1972 | Keszler | 426/281 |
| 3,679,434 | 7/1972 | Bard et al. | 426/281 X |
| 3,890,451 | 4/1973 | Keszler | 426/641 X |
| 3,914,444 | 10/1975 | Svacik | 426/284 |

*Primary Examiner*—S. Leon Bashore
*Assistant Examiner*—Kenneth M. Schor
*Attorney, Agent, or Firm*—Frank T. Barber; Carl C. Batz

[57] ABSTRACT

A process for preparing sliced dried beef in which beef is ground into chunks which are mixed with a curing ingredient, stuffed into fibrous casings and cured. The casings containing cured meat are subjected to a drying procedure in which the casings are immersed in hot brine for a period of time during which moisture content is reduced. The meat having reduced moisture content is chilled, sliced and packaged.

4 Claims, No Drawings

PREPARATION OF SLICED DRIED BEEF PRODUCT

This application is a continuation-in-part of my application Ser. No. 360,049 filed Mar. 29, 1973, now U.S. Pat. No. 3,914,444.

This invention relates to the preparation of a dried, cured meat product of the type sometimes referred to as sliced, dried beef or chipped beef.

BACKGROUND

The process which has customarily been employed in making this type of product requires a large packing facility and a relatively long period of time in processing. In addition, the quality of the product has left much to be desired. In general, the process as it has been carried out commercially during the past years starts with the cutting of beef hams into pieces and putting the pieces into a brine solution. The brine contains an amount of about 25 to 26 percent common salt which is near the saturation point of the solution. The brine solution may also contain nitrites as curing agents. The beef ham pieces are held in this solution for a period of about 40 or 50 days during which time the meat pieces pick up the cure and quantities of the salt. The temperature of the brine solution (sometimes called the "pickle") is maintained at a temperature of about 36°–40° F. during this brine treatment. A warmer temperature would "break" the pickle and produce what is commonly called a "rusty" condition. At the end of the pickle treatment the meat is removed from the brine, washed and put into water to soak overnight which serves to remove some of the salt concentration at the surface of the meat. The meat pieces are then trimmed and hung in a heated area (140°–150° F.) to dry for about 120–170 hours. Following this the meat is tempered at room temperature, then chilled, sliced and packaged. Usually the slices are packed together, folded and packed in glass jars. The product may contain salt in an amount of 10–12 percent, and moisture of the order of 50 percent.

Instead of soaking the relatively large pieces of beef in brine as above described it is known that the beef may be ground to form chunks of about 3 to 8 ounces and to mix and work the pieces along with salt and seasonings to bring out salt soluble proteins from the meat after which the mixture is stuffed into casings with the proteins serving along with the frayed edges of the pieces to bind the meat into a unitary body. Casings thus filled may be further treated by curing and drying in a heated chamber as above described. Such a process is set forth in U.S. Pat. No. 3,497,361.

It may be observed that in the processes above outlined long periods of curing and drying are involved. The long drying period requires the provision of heated rooms for holding the product over long periods of time, principally for the purpose of reducing the moisture content of the meat. In such a process the space requirements are substantial and the maintenance of elevated temperatures adds to the cost of processing.

SUMMARY

Accordingly, I have set myself to the task of discovering methods by which the necessary reduction in moisture of the meat can be accomplished in lesser periods of time or in ways which will not require the extensive drying facilities previously required.

Further, the product heretofore produced was subject to case hardening near the outer rim of the slice and we have sought methods which would eliminate such case hardening, thus providing a more uniform product of improved tenderness and quality.

I have discovered that the foregoing objects may be accomplished by introducing into the process of preparation a drying step in which the meat is held within a fibrous casing for a period of time in a brine solution maintained at elevated temperature during which period the moisture is reduced while maintaining the salt equilibrium of the meat. Our process is explained in greater detail in the course of the following Detailed Description in which one embodiment of my process is set forth.

DETAILED DESCRIPTION

Meat obtained from the hams of beef may be put through a grinder equipped with a two-hole grinding plate, to make pieces of irregular shape averaging preferably about 3 to 4 ounces in weight. The sizes of the meat pieces may be smaller or greater if desired. Normally I contemplate pieces averaging about 3 to 8 ounces in weight. These pieces may be put in a mixer, the salt and curing ingredients added, and the mixer operated for a few minutes to cause the salt to be thoroughly and uniformly distributed.

I prefer to add somewhat more salt than in the prior practice. The specific amount of common salt which is preferred to be used depends, for one thing, upon whether it is desired to produce a product which is more or less salty to taste. The amount of salt may vary, for example, from about 3 to 11 percent. If 7.75 percent salt was found according to prior practices to be about right for producing a sufficiently salty and stable product, then I would prefer in my process to use about 9.0 percent salt, or an increase of from about 1 to 3 percent. A typical meat mixture for use according to my invention might be given in the following Table I. As given in this table the meat including moisture contained therein is taken as 100 percent, and the salt and other ingredients are listed as percentages based on the meat.

TABLE I

|  | Percent |
|---|---|
| Meat | 100 |
| Common salt | 9.0 |
| Sodium erythorbate | 0.55 |
| Sodium nitrite | 0.0148 |

The meat mixture with salt and curing ingredients added may be stuffed into fibrous casings. Such casings may be cylindrical in shape having a diameter of, for example, about 4 or 5 inches, and made of cellulose fibers. Cloth casings may be used, if desired, it being required only that the casings be strong enough to retain their shape and to pass moisture from the meat into the brine solution as the brine treatment proceeds.

After stuffing, the casings are then left to cure in the cooler at about 36° to 40° F. for a period to develop the cure, suitably about 3 or 4 days. A longer cure can be given, but without particular advantage.

Following the curing period the filled casings may be put into a steam jacketed kettle and immersed in a brine solution having a salt concentration of from 8 to 26 percent. The brine solution with the filled casings immersed therein is heated to about 170° to 210° F., preferably about 175° to 190° F., and held at this elevated temperature for a period to dry the meat. The drying period while heated and immersed in brine solution may be from about 8 hours to about 16 hours.

At the end of the brine drying period the filled casings are removed from the brine solution, showered for a few minutes with water of about 130° to 160° F. and hung for a period of 8 or more hours in a heated room (about 140° to 145° F.) to produce an additional decrease in moisture. Following this the stuffed casings may be tempered at ambient temperature conditions for a period, suitably about 60 to 72 hours, and then chilled, sliced and packaged.

The meat filled casings when subjected to the drying steps above described may be reduced in weight by at least 20 percent during the brine drying procedure, by a further amount of at least 5 percent during the holding period in the warmed atmosphere, and then by a still further amount of about 5 percent or more in the tempering step at ambient temperatures, which may amount to a total shrink of about 30 to 50 percent. The desirable amount of shrink may vary, but from 35 to 45 percent is generally considered desirable, but somewhat more or less may be satisfactory.

By an alternate procedure which has some advantages the stuffed casings are not hung in a heated area following the drying procedure as above described, but instead are passed directly to the tempering step where they may be held at ambient temperatures for a period of about 72 to 120 hours, after which they may be chilled, sliced and packaged. This alternate procedure eliminates entirely the need for holding the meat in a heated facility for drying purposes. Though the period for holding the meat at ambient temperature is somewhat longer than in my process first described, this process may be preferable where facilities for holding at elevated temperatures are not readily available.

In this alternate procedure the reduction in weight during the final holding period at ambient or room temperatures may be from about 7 to 14 percent or more, and may bring the total shrink by this procedure well within the limits desired.

In addition to the advantages of a shorter processing time, my processes have been found to produce an improved product in that the case hardening at the edges of the slice is eliminated or at least diminished, leaving a more uniform texture and a product which generally is more tender. Further, the color of the product is somewhat lighter than previously experienced causing the product to look more attractive.

I have further found that where it is necessary or desirable that the beef which is to be used in my process be frozen for purposes of transporting or storing the beef, somewhat different conditions are preferred. For example, when the beef from a slaughtering house in one location is to be ground and cured at a plant in a different location, it may be desirable to freeze the beef to preserve it while in transit and when the beef is purchased on the market the beef may have been frozen for purposes of preservation.

The freezing of the beef is customarily done at temperatures of -10° to -30° F, or it may be that the beef is not entirely frozen but bears a frozen outside crust with the interior still unfrozen. In this description we use the term "frozen" to describe the beef whether it is frozen throughout or only frozen on its outside surface.

Of course, beef which has been hard frozen must be thawed before it can be ground. When the beef has been frozen and thawed the beef may be ground as before described and put in a mixer with the salt and curing ingredients. However, the mixing time should preferably be shortened to from about 8 to 10 minutes. When the meat has been frozen and thawed there is likely to be objectionable smearing of the meat and the shortened mixing time has been found to avoid this.

In the use of the pre-frozen and thawed beef, the curing step may be practiced as hereinbefore described, but in the drying of the beef in brine solution, I prefer to use somewhat lower temperatures within the range of 120° to 190° F, with better results when the temperature is within the range of 140° to 170° F. In addition, I find that the best practice is to start the brine treatment at about 140° F and increase the temperature in a stepwise manner, about 10° at a time until the temperature is about 170°. For example, I may start with a temperature of about 140° F for about an hour then increase the temperature to about 150° F for another hour and continue to increase the temperature each hour by about 10° until the temperature reaches about 170° to 190° F. The temperature of about 170° F to 180° F then may be maintained until the meat has reached the desired degree of dryness.

In all other respects the process for treating the beef which has been pre-frozen and thawed may be the same as the process set forth about for beef in general.

To further illustrate the practice of my invention I give the following specific examples:

EXAMPLE I

Beef hams were boned and trimed and ground through a grinder with a two-hole grinding plate to yield meat pieces averaging about 3 to 4 ounces in weight. 100 pounds of this meat was placed in a mixer along with a curing mixture in the proportion of 8.3 pounds per 100 pounds of meat, the curing mixture containing common salt sodium erythorbate and sodium nitrite in the percentage proportion of 7.6:0.55: 0.0148, these percentages being based on the weight of the meat. The meat and curing mixture was mixed until a creamy exudate appears on the outer surfaces of the pieces of meat. Then 8.4 pounds of this meat mixture was stuffed into a No. 6½fibrous casing (4¼to 4½inches in diameter) and the filled casing held for curing in a cooler at a temperature between 36° and 40° F. for 3½days, after which the cured casing was placed in a jacketed kettle containing 10 percent of sodium chloride heated to 180° F. After heating in the brine solution for 8 hours the casing was removed from the brine, showered, skivered and placed in a heated house (about 140° to 145° F) for 16 hours after which the product was put in storage in the cooler and later sliced. Tests showed a shrink of 17.7 percent in the brine solution and 5.4 percent in the warm house, with a total shrink of 38.7 percent from the weight of the cured casing. The filled casing weighed 8.2 pounds after curing and after the drying treatments weighed 5.25 pounds. Total drying time involved was 88 hours. The diameter of the casing when sliced was 3.3-5/16 inches. The product had a good color, texture and aroma.

EXAMPLE II

The same procedure was used as set forth in Example I, except that the time in the brine solution was increased to 16 hours and the time in the warm room was decreased to 8 hours. This resulted in a shrink of 23.2 percent in the brine step and a shrink of 5.3 percent in the warm room step, and an overall shrink from the stuffed weight of 39.3 percent.

EXAMPLE III

The same procedure was used as set forth in Example II except that the meat mixture was stuffed into a size 7½ casing (diameter of 4.68 inches to 4.75 inches). There was a 20 percent shrink during the processing in the brine solution and a 5.65 percent shrink in the warmed room resulting in a total shrink of 34.6 percent. The diameter of the casing when sliced was 3⅞ inches.

EXAMPLE IV

The same procedure was used as set forth in Example I except that the brine treatment was continued for 12 hours and the treatment in the warm room was 12 hours. This resulted in a shrink in the brine solution of 20 percent and in the warm room of 5.45 percent, and a total overall shrink of 37.5 percent.

EXAMPLE V

The same procedure was used as set forth in Example III except that 9.9 pounds of meat was used in the test and the mixed meat included curing ingredients in the proportion, based on the weight of the meat, of 9 percent sodium chloride, 0.55 percent sodium erythorbate and 0.0148 percent sodium nitrite. The hot brine solution in which the filled casing was treated contained 15 percent sodium chloride. There was a 19 percent shrink in weight during the treatment in the warm room. The casing was further dried for 96 hours at ambient temperature to shrink it another 9 percent resulting in a total shrink of 38.1 percent in the drying steps and a drying time of 120 hours.

EXAMPLE VI

The same procedure was used as set forth in Example V except that the hot brine employed contained 20 percent sodium chloride. The shrink was 23.3 percent in the hot brine treatment and 7.2 percent in the warm room drying step and 15.2 percent in the 120 hour drying step at ambient temperature, resulting in a total shrink in the drying steps of 41.0 percent.

EXAMPLE VII

The same procedure was used as set forth in Example VI except the drying step in the warm (140° F) room was omitted altogether and the ambient temperature drying step was continued for 104 hours resulting in a shrink during the drying steps of 41.6 percent.

EXAMPLE VIII

As a control, 25 pounds of the meat mixture containing curing ingredients as described in Example V was stuffed into casings size No. 8-U, and subjected to the curing step as described in Example I. The cured filled casings were held in a warm room for 6 days to obtain a shrink of 35 percent and then held at ambient temperature for 48 hours to obtain a total shrink from the cured weight of 40 percent with a total time of 230 hours.

EXAMPLE IX

Beef hams were trimmed of substantially all fat and connective tissue at a commercial beef braking facility at a distant location. The trimmed beef was then boxed and shipped via freezer truck to a location where it was to be processed. When received, the beef was hard frozen and was thawed for 24 hours at 40° F and an additional 2 hours at 55° F.

The thawed beef was ground as in Example I to produce pieces ranging from 2 to 8 ounces. The ground meat was then placed in a conventional meat mixer with the following ingredients per hundred weight of meat:

9.0 pound of salt,
0.25 oz. sodium nitrite*
0.866 oz. sodium erythorbate*
1.0 pound water

*These items were predissolved in 1 pound water prior to adding to the meat.

After adding the above ingredients, it was noticed that the meat chunks started to exude moisture from the previously frozen cells. The batch of meat started to develop a slight emulsion appearance after 8 minutes of mixing. Final mixing time was 10 minutes and the internal temperature of the product was noted to be 34°-36° F. It did not have a tacky or sticky feel. The product was stuffed into an EZ peel prestuck fibrous casing and cured in a 34°-40° F cooler temperature for 3-7 days.

The cured beef sticks were submerged in a 20 percent solution and the temperature was increased 10° F each hour from an initial temperature of 140° F to a maximum of 170° F. The product had a shrink of 24-26 percent in approximately 10-12 hours. A final total shrink of 36-40 percent was achieved by drying at room temperature (72°-80° F) for approximately 60-72 hours.

The product was then chilled, sliced and packed in containers. It had a quality fully equivalent to the product prepared as heretofore described and prepared from fresh meat.

While in the foregoing detailed description I have described only a few embodiments of the invention, it is understood that the process may embody many and various specific practices, and that many changes may be made without departing from the spirit of the invention and being contained within the scope of the appended claims.

I claim:

1. In a process for preparing a dried beef product including stuffing pieces of beef which has been frozen and thawed along with curing ingredients into a preformed fibrous casing, curing said beef in said casing, subjecting the cured beef to a drying procedure to remove moisture therefrom, and chilling and slicing the dried beef, the improvement comprising conducting said drying procedure by immersing said casing containing the cured beef in a solution of common salt having a concentration of from 8 to 26 percent at a temperature of from 120° to 190° F for a period of time sufficient to remove a substantial amount of moisture from the meat.

2. A process as set forth in claim 1 wherein said temperature is from 140° to 180° F.

3. A process as set forth in claim 1 wherein said temperature at the beginning of the drying step is about 140° F and said temperature is increased stepwise until a temperature of about 170° to 180° F is reached and said temperature of 170° to 180° maintained until said meat has attained a desired degree of dryness.

4. A process as set forth in claim 1 wherein said pieces of beef are mixed with said curing ingredients for a period of 8 to 10 minutes after which the mixture is stuffed into said casing.

* * * * *